April 11, 1967     E. G. THOMPSON ETAL     3,313,629
AGGLOMERATING PROCESS FOR POWDERED FOOD SOLIDS OR THE LIKE
Original Filed Aug. 24, 1962     2 Sheets-Sheet 1
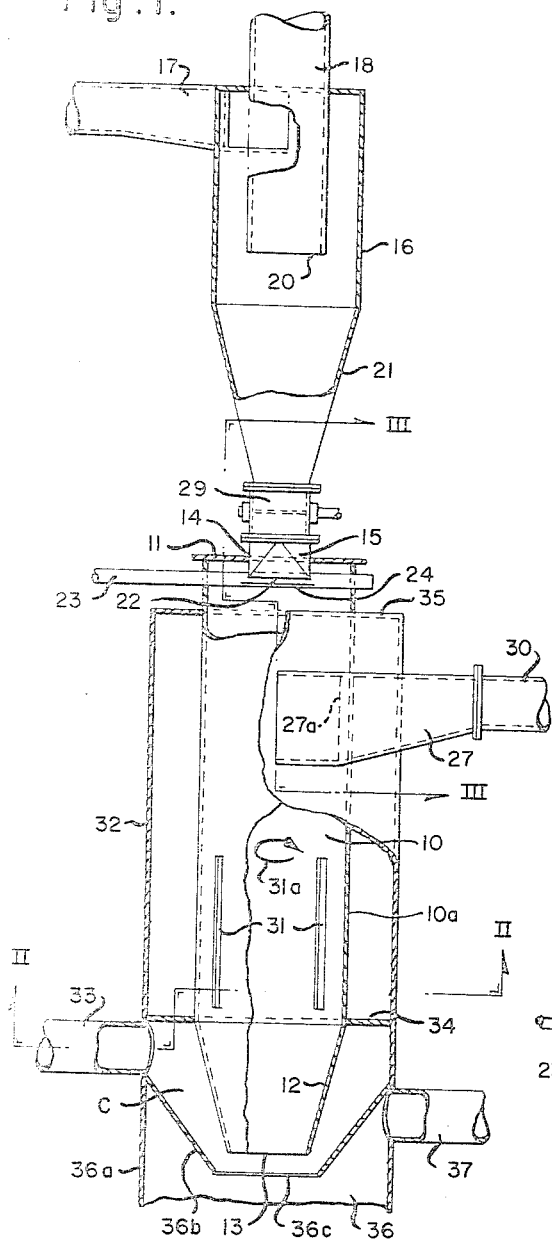
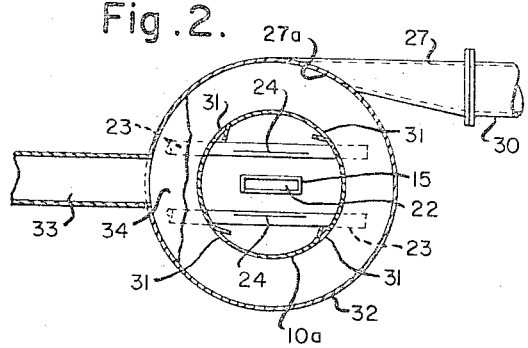
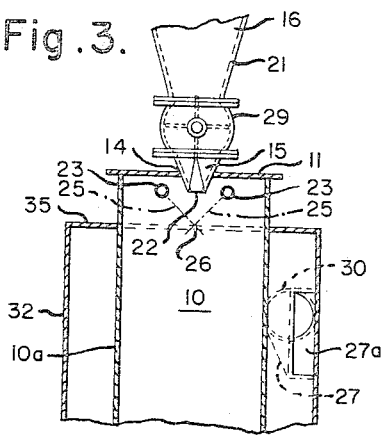
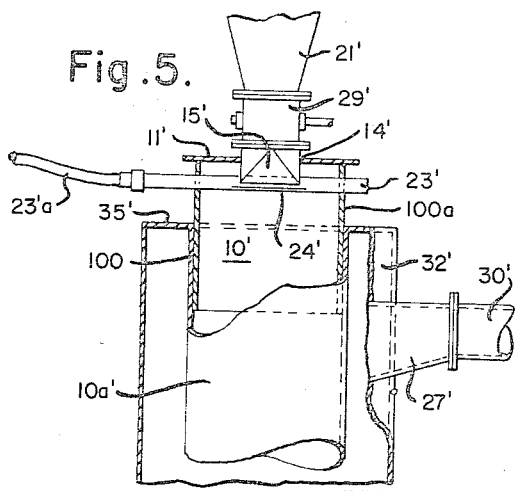
INVENTORS
Ellis G. Thompson,
Ervin C. Dubbels and
William Ostrom
BY
their attorneys

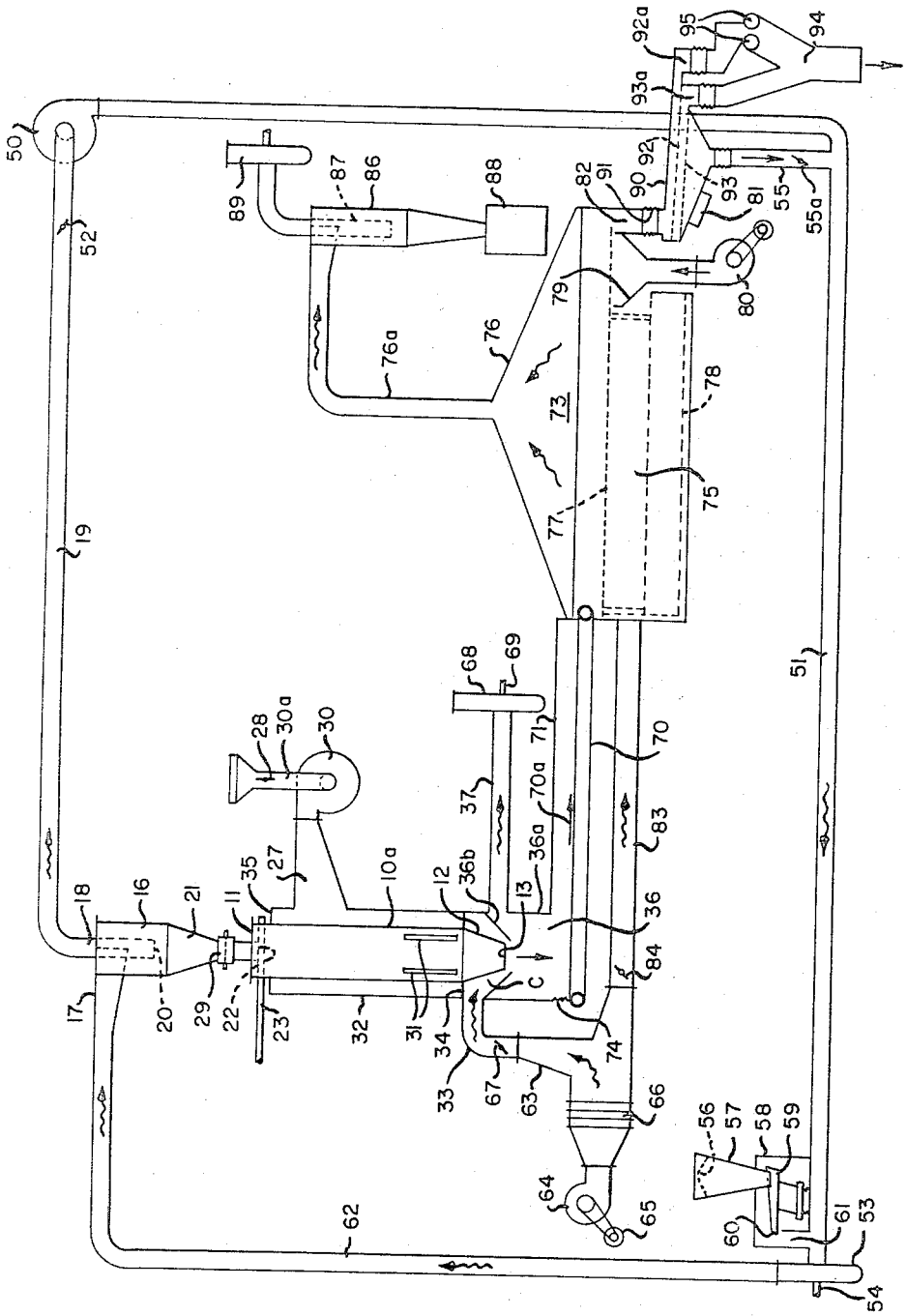

United States Patent Office 3,313,629
Patented Apr. 11, 1967

3,313,629
AGGLOMERATING PROCESS FOR POWDERED FOOD SOLIDS OR THE LIKE
Ellis G. Thompson and Ervin C. Dubbels, Mora, and William Ostrom, Ogilvie, Minn., assignors to Blaw-Knox Company, Pittsburgh, Pa., a corporation of Delaware
Original application Aug. 24, 1962, Ser. No. 219,183. Divided and this application Aug. 12, 1965, Ser. No. 485,143
3 Claims. (Cl. 99—56)

This is a divisional application of U.S. application Ser. No. 219,183 filed Aug. 24, 1962.

This invention relates to apparatus and process for agglomerating powdered food solids or the like into larger powder clustered particles capable of more uniform and/or rapid dispersion and/or solution in water or other liquid. More particularly, this invention pertains to a new gas whirling construction and process for such agglomeration of various powdered food materials particularly and comprises an improvement upon subject matter of United States Patent No. 2,893,871.

A practice of this invention is applicable to a variety of dried powder food solids including without limitation skimmed milk and other milk base foods, as well as to non-milk base food, generally of a kind which are in a dried fine powder form, which may or may not have been treated to become relatively non-hydroscopic, and present small surface area relative to their specific densities, respectively. This invention enables such a dried powder food solid to be agglomerated with more precise achievement of moisture control and contact time in the agglomeration phase to provide relatively greater uniformity of product, selection of desired bulk density, moisture content and economy of operation. Advantages accruing to a practice of this invention include relative freedom from accretion of sticky masses in processing equipment, flexibility of regulation and processing, predictability of product specification and relatively uniform and rapidly instant dispersion and solution in water, for example, when such is used to reconstitute an agglomerated food solid such as skimmed milk product of this invention.

Other objects, features and advantages of this invention will be apparent from the following description and the accompanying drawings, which are schematic and illustrative only, in which:

FIGURE 1 is a view in elevation and partly in section of an agglomerating apparatus embodiment of this invention;

FIGURE 2 is a view in section taken along line II—II of FIGURE 1;

FIGURE 3 is a view taken in section along line III—III of FIGURE 1;

FIGURE 4 is a schematic view of the embodiment of FIGURES 1 to 3, inclusive, incorporated in an operation system for agglomeration of powdered food solids or the like; and FIGURE 5 is a view in elevation, partly broken away, of the changed part of a further embodiment of this invention.

Referring to FIGURES 1 to 4, inclusive, of the drawings, an agglomerating chamber 10 is provided having, in the form shown, a vertical cylindrical wall 10a, a closure plate 11 at the top thereof and a hollow frusto-conical portion 12 at the bottom thereof defining a central bottom outlet opening 13. Plate 11 is provided with a slot 14 for the lower end of a neck 15 of a feed cyclone 16, the slot being sealed around neck 15. Cyclone 16 acts as a separator-collector to separate air from powdered food solids or the like carried by such air into the upper portion of such vessel 16 through a tangential inlet 17.

In cyclone 16, air will make a reentrant turn around the lower edge 20 of a riser pipe 18 and exit therethrough, such lower edge being positioned below inlet 17. Except for entrained, air-borne fines exiting through riser 18 into conduit 19 as indicated by the wavy arrow, the powdered food solids will be thrown down into the downwardly tapering hopper portion 21 of collector 16 which conducts such powdered food solids into a rotary valve 29 which acts as a lock for the bottom of collector 16. Such food solids pass through valve 29 and fall in relatively sheet-like form through a slotted outlet 22 at the bottom of neck 15 below the top 11, into the top of the agglomerating chamber 10. The lengthwise axis of the slot 22 is represented by the plane of the drawing paper in FIGURE 1. The upper part of wall 10a is pierced to each side of a vertical plane through the lengthwise axis of slot 22 for the entrance of a pair of moisture jetting pipes 23 respectively into chamber 10. Such pipes inside of chamber 10 are provided with slits 24 through the wall of each pipe directed to each define a jetting plane 25 for an issuing sheet of moisture, preferably steam. The planes of the moisture sheets together form a dihedral angle or trough as indicated in FIGURE 3 which is substantially bisected by and meets the vertical plane through the lengthwise axis of slot 22 substantially in the area of zone 26 for superficial moisturizing and agglomeration action of the powdered food solid particles falling from slot 22. The food solids undergoing agglomeration into clusters continue to fall and are whirled around, while moving downwardly through chamber 10, in accordance with the introduction of ambient air from outside through tangential inlet slots 31 preferably connected to riser 18, flow through which may be regulated by the setting of a damper 28. Hence, the contact time of moisture and solids and the detention time in agglomerating chamber 10 is subject to some regulation due to such introduction of air through inlets 31 inclusive of the quantity of such air. Chamber 10 is provided with a frusto-conical member at the bottom in the form of downwardly converging ring 12 having a central opening 13 at the bottom thereof where the axial velocity component increases, which appears to assist in developing uniformity in size among the agglomerated clusters and in bulk density thereof.

In general, a longer contact time for other given conditions tends toward greater uniformity among the agglomerated clusters and somewhat greater moisture content in the food particles being agglomerated. Moisture control is primarily obtained in the agglomerating device by regulation of the quantity of steam admitted to chamber 10 through the pipes 23 and slits 24. The total moisture content of the agglomerated product discharged from chamber 10 preferably is kept below 10%, usually far below, on a weight basis. Relatively cool air is admitted to the interior of chamber 10 through openings 31, which preferably are generally vertical and tangential, and extend through the wall of the chamber 10 to the interior thereof. The volume of such air may be regulated by damper 28.

Such cool air is first admitted to an annular jacket 32 surrounding most of chamber 10 through a cyclone inlet 27, the direction of whirling produced thereby corresponding to the directional effect of the tangential flaps of openings 31 as represented by arrow 31a. Air is supplied from atmosphere to inlet 27 by an adjustable speed blower 30, the preferably screened intake of which is provided with a regulating damper 28. An annular bottom 34 and top 35 closes the lower and upper ends of the jacket between wall 10a of the chamber 10 and the outer vertical wall of such jacket 32. The temperature control effect produced by the jacket is also regulatable and a further control factor for moistening of the powdered food solids and agglomeration thereof in chamber 10, the outside of jacket 32 and other parts of the apparatus, being suitably insulated if desired. Such flexibility in moisture control avoids excessive wetting of the food solids and resulting agglomerated clusters and removes the need for, or reduces the amount of after-drying required, or desired, with resulting benefit to the final agglomerated product. Additionally, such whirling inside of chamber 10 inhibits build-up of solids on the inside wall of that chamber, prolongs length of agglomerating time and improves the quantity of the operation and product. Thus, it appears that the conical ring 12 and opening 13 at least tend to exert a sizing effect toward uniformity of the agglomerated product size, with relatively less discharge of relatively fine food solids from the chamber with the agglomerated product. Such frusto-conical member as 12 also acts to avoid buildup or accretions on the inner surface of chamber 10 and increase throughput.

In the illustrated embodiment, frusto-conical member 12 extends below jacket 32 into a chamber 36 which receives the agglomerated product and air discharged therewith, and from which chamber 36 air is exhausted by a suction conduit 37. Chamber 36 is surrounded by a cylindrical wall 36a and the upper end thereof is provided with an internal funnel member 36b forming an annular downwardly converging chamber C surrounding member 12, the funnel 36b having an outlet 36c at the bottom thereof in coaxial relation to opening 13. Chamber C during an operation is filled with air heated to a selected temperature and delivered to it through a supply conduit 33. Such heated air is a further moisture control, regulatable to the desired extent, for agglomerated clusters of food solids or other material being agglomerated in chamber 10 before discharge through member 12 and openings 13 and 36c into chamber 36 proper. Further, a pressure relation is selected by virtue of the respective adjustable speeds of the respective blowers utilized in the system such that the heated air discharged into chamber C exits through outlet 36c and from thence is drawn along with air chamber 10 into the exhaust duct 37 on the outer side of chamber C.

Apparatus hereinabove described may advantageously be utilized in an operating system such as that illustrated schematically in FIGURE 4 of the drawings. Fresh air at room or ambient temperature is drawn into the system at least through intake 30a, inlet 27 and opening 27a, the quantity of air taken in being a function of a setting of a damper 28, the suction force exerted by a centrifugal blower 30 driven by a motor (not shown) and the remaining selected gas flow factors in the system. Air is also recycled in the system through a branch conduit 55 through which screened undersized food solids particles return to the system past an adjustable damper 55a. Conduit 51 is the discharge conduit for a blower 50 which recycles air and entrained solids from duct 19, a damper 52 being used to regulate the gas flow relation in duct 19 adjacent the inlet of blower 50 which is driven by an adjustable speed motor (not shown).

Feed of powdered food solids, preferably in stabilized non-caking condition but too fine normally for proper dispersion and/or solution upon reconstitution, is obtained by supplying such food solids 56 to a hopper 57 mounted in the top of an enclosure support 58. The bottom of hopper 57 is open and at all times above a feed shaker tray 59 of conventional nature suitably mounted for shaking within enclosure 58. The front edge 60 of tray 59 is at all times above a feed inlet branch 61 opening into conduit 51 adjacent to the suction side of blower A 53 driven at selected speed by a motor (not shown) through a shaft 54. The discharge from blower 53 comprises air and such freshly fed food solids, plus the respectively undersized screenings from branch 55 and from duct 19, all for air-borne suspension transfer through pneumatic conveyor conduit 62 and discharge into hopper-collector 16 through a tangential cyclone feed inlet 17 in the illustrated embodiment. As the air-borne food solids with their carrier air whirl downwardly around the outside of the lower end of riser 18 in collector-hopper 16, the food solids separate from the carrier air and pass into hopper portion 21 for preferably sheet-like feeding through slot 22, as described above, into the upper end of agglomeration chamber 10 and the apex of the moisture trough formed by the moisture sheets dihedral angle 25—25. The carrier air continues up through riser 18, which passes through the closed top of the cyclone collector 16, and preferably continues on into recycle conduit 19, the flow through conduit 19 being regulated as desired by damper 52. In the carrier air passing through conduit 19, there are entrained fines which thereby are restored to the processing cycle for utilization thereof.

The agglomerating action which goes on in agglomerating chamber 10 has been described above. Therein agglomerating product of a selected bulk density size and moisture content and relatively uniform consist is made and discharged from the bottom outlet opening 13 into chamber 36. Heated air for conduit 33 and jacket C is supplied from a plenum 63 which receives air from a blower 64 driven by a motor 65, the ambient air drawn into blower 64 from the outside being passed through heater coils 66 before being discharged into the plenum 63, such coils being either electrically or otherwise heated and thermostatically controlled if desired. A damper 67 in the passage between the plenum and conduit 33 is provided for regulation of the quantity of heated air supplied to chamber C and 36. In this way, it will be recognized, the agglomerated product discharged through opening 36c may have substantially the same net moisture content as the moisture content of the original food solids 56, or a somewhat greater, or lesser, moisture content as selectively desired, despite an increase thereof which normally takes place in zone 26. Additionally, different food solids treated in accordance with the practice of this invention, varying as they do in specific gravity, moisture content, adherency characteristics and agglomerating conditions, will have conditions of operation readily selected pursuant hereto and hereunder to suit them respectively.

Conveyor chamber 36 comprises an enclosure having an exhaust conduit 37 leading therefrom to a centrifugal exhaust blower 68 driven by a motor (not shown) through a shaft 69. The blower 68 as shown discharges to atmosphere. Chamber 36 is an enclosure, the bottom of which is a conveyor belt 70 suitably driven by means not shown, which conveyor may be either a solid belt or a screen. A sheet metal housing 71 forms the sides, ends and top of the enclosure of the conveyor enclosure, air entering with agglomerated product through opening 13 and heated air through opening 36c, with further air available if conveyor 70 is made in screen form. The entry end of chamber 36 where inner chamber C is located is high enough to enable chamber C to surround frusto-conical member 12 so that agglomerated product as it is discharged is heated before it drops onto the rear end of the conveyor 70. The upper reach of conveyor 70 moves in the direction indicated by the arrow 70a to conveyor agglomerated product in the illustrated embodiment to a conventional after-dryer 73. The bottom edge of the back of the entry portion of conveyor chamber 36 has a flexible curtain section 74 to engage the back of the upper reach of the belt conveyor 70 to keep dust and dirt away from the flow of processed material, although the operation does not have to be carried on in any air-tight apparatus. Conveyor 70 discharges agglomerated product into dryer 73 whenever one is utilized. When it is not, the agglomeration product discharged from agglomeration chamber 10 is cooled in housing 71 as by admitting room or ambient air to chamber 36 and discharging the product as final product directly or from the delivery end of conveyor 70 directly to a sizing classifier such as classifier 90.

After-dryer 73 has a sheet metal enclosure comprising a body 75 and a hood 76. Within the body, there is a drying screen 77 independently supported by and for vibration on a drive base 78. The rear part of the screen extends over a cooling air vent 79 to which cool air is supplied by a motor-blower 80, which obtains cooling air from the room, plant, or from outside, as desired. Agglomerated product falls from the discharge end of the upper reach of conveyor 70 onto the drying screen whence it is made to advance by vibration toward a finished product outlet 82 in dryer 73. Heated drying air is supplied to the underside of screen 77 within body 75, in advance of vent 79, by a drying air passageway 83 which receives hot or heated air from plenum 63, a damper 84 in the passageway being utilized to regulate further the quantity, and, hence the desired end moisture content and firmness of the final agglomerated product, the temperature rise in the product induced by the drying being removed to a desired extent by cooling vent 79. The drying air is exhausted through a hood 76 and a dryer exhaust conduit 76a which admits the effluent tangentially into a cyclone 86 wherein a separation conduit 87 separates the gaseous portion of the entering material from the suspended fines which fall into a fines holder 88, from which they may be returned to hopper 57, or, if desired, to conduit 19, for return to the agglomeration system. A blower 89 suitably driven provides the suction for the removal of such separated gas and for its discharge to atmosphere. It is evident that other means such as filter bags and the like may be used to separate such entrained fines from the dryer effluent gas.

The agglomerated product which passes into outlet 82 is classified in a shaker screen classifier 90 to which the outlet 82 is connected by a flexible boot collar 91. Classifier 90 is enclosed, may be shaken by a vibrator 81, and is provided with an upper coarser screen 92 and lower select finer mesh screen 93, the screens respectively leading to discharge outlets 92a and 93a for somewhat oversized clusters and for select size clusters of agglomerated product, suitable flexible boot collars being supplied to connect such outlets to a final product receiver 94. A pair of sizing rolls 95 suitably driven may be inserted in the passageway from outlet 92a to reduce oversized clusters to the select agglomerated product size discharged into outlet 93a. Finer size solids passing through screen 93 pass into conduit 55 through a flexible boot collar connection and are returned to the process system as described above.

A further embodiment is shown in part in FIGURE 5 substantially to illustrate only portions of an agglomerating chamber, similar to chamber 10, which are changed, those parts in FIGURE 5 corresponding generally in construction and functioning to parts indicated in the first hereinabove described embodiment being given the same reference numerals with the addition of a prime accent thereto. In FIGURE 5, the upper part of chamber 10', marked 100a, is in slidable telescoping relation to the remaining portion of chamber 10', the sliding fit being indicated at 100. The selected adjusted position being top 100a and the remainder of chamber 10' may be fixed by set screws or other holding devices to hold the selected over all height of chamber 10'. And, suitable means would be provided for raising and lowering hopper 21' and/or the apparatus immediately below top portion 100a whenever such a telescoping adjustment is to be made to shorten or lengthen such over-all height of chamber 10'. A flexible hose 23a' is coupled to each of the pipes 23' to accommodate such an adjustment.

Although the gas utilized in describing hereinabove the operation of the invention, has been air, it will be recognized that other gas may be utilized in one or more of the gas flow portions of the invention; that conventional instead of pneumatic conveying may be employed and vice versa; and that selection of pressure relations and balances in the agglomerating chamber and other portions of the system may be varied in accordance, inter alia, with variations in the nature of the feed, desired moisture content and/or product specification.

Various changes may be made in the agglomerating system embodiments described above and related embodiments provided without departure from the spirit of our invention or the scope of the appended claims.

We claim:

1. In a method of agglomerating powdered food solids and like powdered agglomerable solid materials, in combination, pneumatically conveying said powdered agglomerable solids in a carrier gas to an elevated location, separating substantially all of said powdered agglomerable solids from said carrier gas at said location, discharging said separate agglomerable solids in relatively sheet-like form in an enclosed agglomerating zone, providing a substantially V-shaped trough defined by sheets of steam and positioned so that the apex thereof is generally bisected by said sheet-like fall of powdered agglomerable solids, recycling said carrier gas with relatively fine unseparated powdered agglomerable solids in connection with said conveying, whirling the powdered agglomerable solids in said agglomerating zone to a selected extent around a vertical axis by introducing whirling gas into said zone, increasing the axial velocity component of flow of the powdered agglomerable solids in said agglomerating zone by passage thereof through a gradually constricted opening, discharging agglomerated product from said agglomerating zone by passage thereof through said constricted opening, and selectively introducing heated gas around said constricted opening to control the final moisture content of the solids, all the while maintaining the total moisture content in the solids during processing below the solubility level for said powdered agglomerable solid.

2. Method as set forth in claim 1 comprising further drying said agglomerated product for final adjustment of moisture content and firmness, and size classifying said product.

3. In a method of agglomerating powdered agglomerable solids, in combination, conveying said powdered agglomerable solids to an elevated location, discharging said separate powdered solids for gravity fall in an enclosed agglomerating zone, providing a trough defined by sheets of moisture and positioned so as to be intersected by said fall of powdered solids, introducing relatively cool ambient air into said agglomerating zone in a whirling manner below said trough, discharging agglomerated product from said agglomerating zone through a bottom opening, and heating said agglomerated product for adjustment of moisture content and firmness by the introduction of heated air around said bottom opening below said first-mentioned introduction of air and in which said agglomerated product is sized at least in part thereof by passage through said opening in an accelerated manner, all the while maintaining the total moisture content of the solids during processing below the solubility level for said powdered agglomerable solid.

References Cited by the Examiner

UNITED STATES PATENTS

| | | | |
|---|---|---|---|
| 1,829,477 | 10/1937 | Douthatt | 159—4 |
| 2,525,224 | 10/1950 | Kaiser | 159—4 |
| 2,835,586 | 5/1958 | Peebles | 99—56 |
| 2,893,871 | 7/1959 | Griffen | 99—56 |

A. LOUIS MONACELL, *Primary Examiner.*

M. W. GREENSTEIN, *Assistant Examiner.*